United States Patent [19]

Cooper

[11] Patent Number: 4,831,321

[45] Date of Patent: May 16, 1989

[54] TRICKLE JUMPING CHARGING DEVICE

[76] Inventor: Robert Cooper, Box 132, Ulysses, Kans. 67880

[21] Appl. No.: 135,935

[22] Filed: Dec. 21, 1987

Related U.S. Application Data

[63] Continuation-in-part of Ser. No. 21,176, Mar. 3, 1987, abandoned.

[51] Int. Cl.[4] .................................................. H02J 7/00
[52] U.S. Cl. .......................................... 320/25; 320/2
[58] Field of Search ....................................... 320/2-5, 320/25, 26; 361/58

[56] References Cited

U.S. PATENT DOCUMENTS

| | | | |
|---|---|---|---|
| 3,571,608 | 3/1971 | Hurd | 320/25 |
| 3,896,364 | 7/1975 | Reister | 320/2 |
| 4,258,305 | 3/1981 | Anglin | 320/2 |
| 4,463,402 | 7/1984 | Cottrell | 320/25 |
| 4,670,700 | 6/1987 | Henkel | 320/2 |

*Primary Examiner*—Patrick R. Salce
*Assistant Examiner*—Anita M. Ault
*Attorney, Agent, or Firm*—Frisenda, Morris & Nicholson

[57] ABSTRACT

A trickle jumping device for charging liquid cell and jell cell storage batteries is provided by the present invention. In a presently preferred embodiment, the device comprises a conductor to a directional slip receptacle, a slip plug connected to a smaller amp hour battery using a prescribed terminal connector, and a current limiting device such as a wire wound resistor to provide a close tolerance means of controlling current with very little variance because of heat. Preferably, the trickle jumping device polarity is determined by the use of a diode, so that the polarity of a smaller charge battery is maintained if the jumper is connected incorrectly.

8 Claims, 2 Drawing Sheets

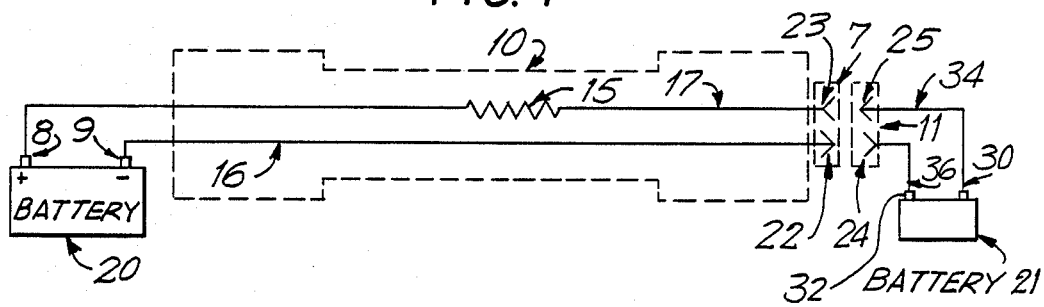
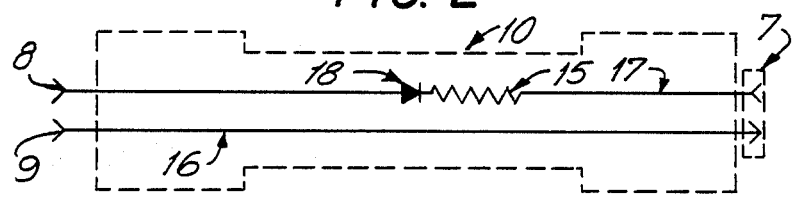
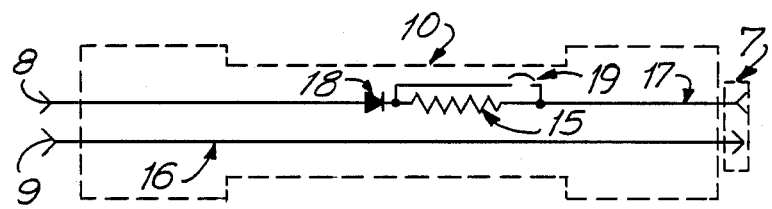
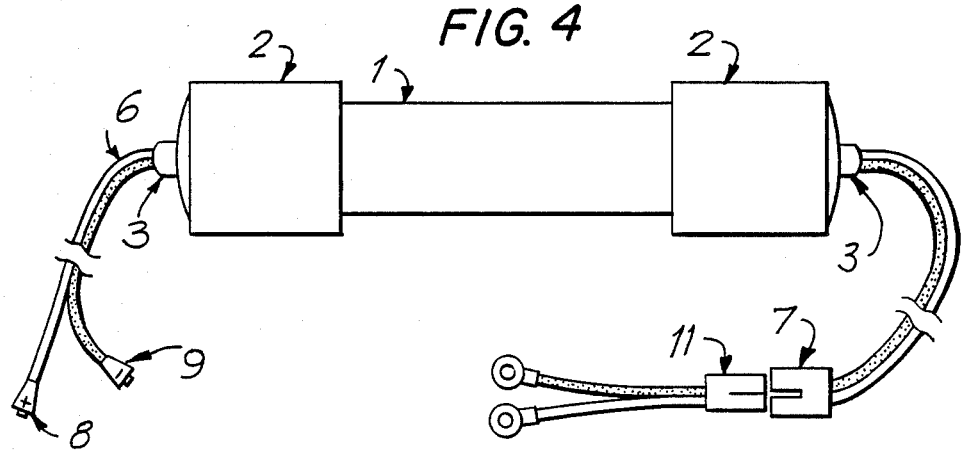

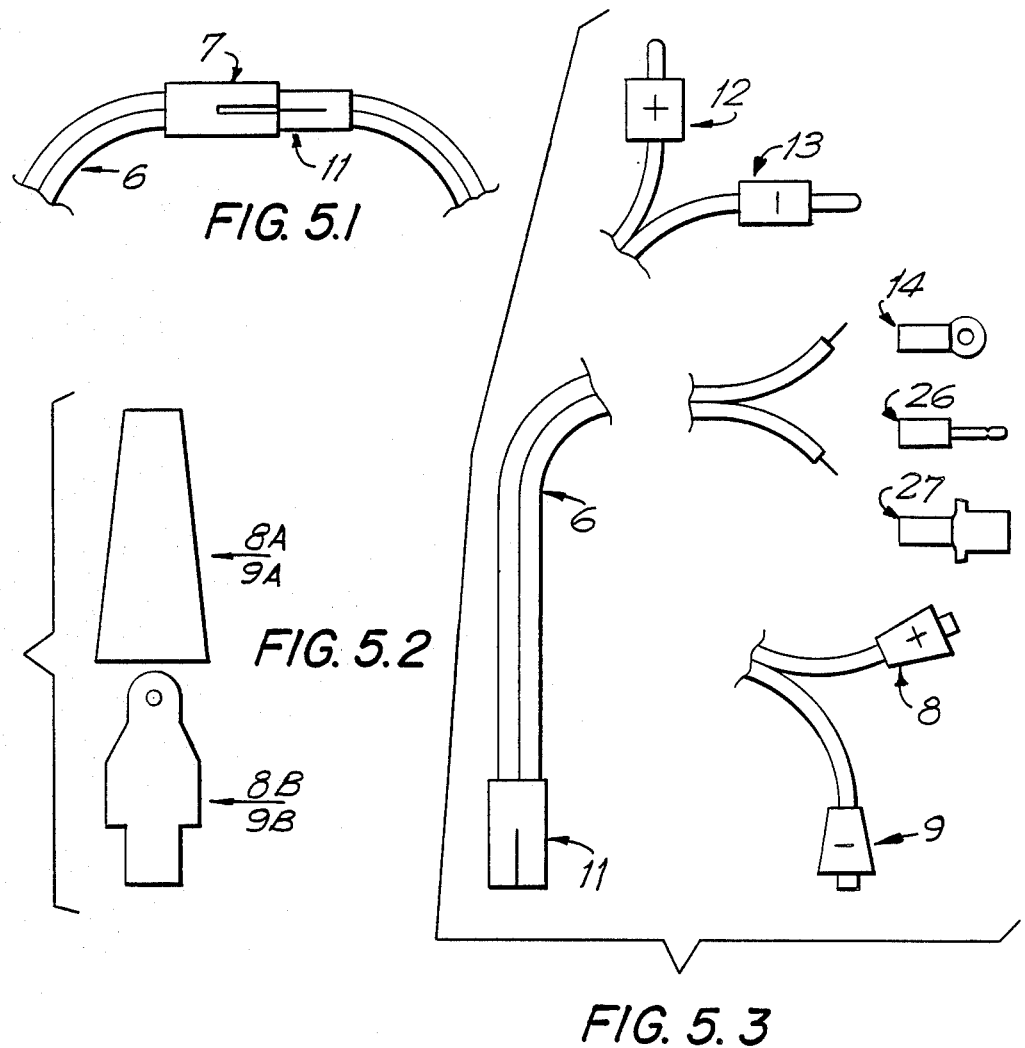
FIG. 5.1
FIG. 5.2
FIG. 5.3
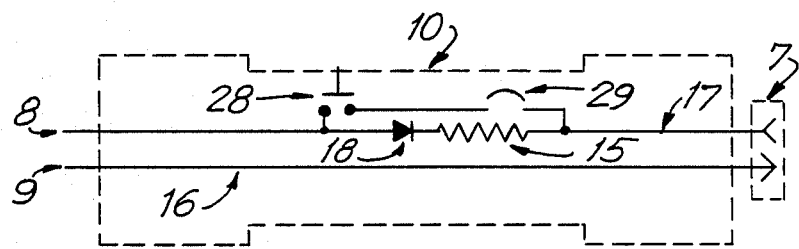
FIG. 6

TRICKLE JUMPING CHARGING DEVICE

This is a continuation-in-part of Serial No. 021,176 filed Mar. 3, 1987.

BACKGROUND OF THE INVENTION

1. Field of the Invention

This invention relates generally to battery chargers, and in particular to the battery chargers for small storage batteries in appliances, small motorized vehicles and equipment installed in fields or other remote locations.

2. Description of the Prior Art

In recent years there has been a greater use of small, but powerful low current storage batteries in lawnmowers, lawn-tractors, solar recharged fence chargers, in-field radio transmitting equipment, and motorcycles. These batteries are generally of the liquid cell and jell cell type. In the past, the only manufacture recommended way to recharge these small batteries, was to bring the discharged battery to an AC source, and hook-up to a small, often expensive charger, until the discharged battery was recharged.

Commonly when a storage battery is discharged, there is no convenient AC source nearby. Consequently, one is faced with the choice of transporting often bulky pieces of equipment to an AC source or removing the battery, transporting the battery to an AC source and reinstalling it or jumping the battery from another battery with jumper cables. The prior art alternatives were often impractical, inconvenient or dangerous. Often the battery powered equipment was bulky or permanently installed in a remote location. Thus, moving the equipment could be time consuming and inconvenient. Similarly, removal of the battery for transportation to an AC source can also be time consuming and inconvenient. Moreover, the equipment will be inoperative during the time the battery is removed unless a temporary replacement is available. Jumping the small battery with conventional jumper cables is also unsatisfactory. Such cables are directly connected to the battery terminal, with the connection of the last connector to a terminal, the final hookup. In the use of conventional jumper cables, there is a danger of a large current surge which can melt the internal contacts of the battery and possibly cause an explosion with resulting damage to person and property. Typically these storage batteries require a charging rate of between 0.5 amp to 3 amps. When the charging rate exceeds 6 amps, on a 30 amp-hour battery, there is a danger of a melting of the internal contacts and an explosion of the storage battery. When the charging rate exceeds 25% of the battery amp-hours of some small batteries, you begin to risk internal construction parts damage to the battery. For instance, a 30 amp-hour battery could have a charging range of 0-7.5 amps with an average range of 3 amps. This tolerance allows for short current surges that can occur at charging and attempting to start a motorized vehicle at the same time. Another problem with jumper cables is there is often a spark generated at the terminals during final connection of the last cable. Such sparks can ignite the gasses given off at the battery terminals thus producing an explosion.

Prior art battery chargers have been proposed. For example, U.S. Pat. No. 4,258,305 provides an emergency battery charger for vehicles having cigarette lighters. A cigarette lighter plug is provided for engagement in the cigarette lighter of each vehicle. The plugs are connected by a conductor having a light connected thereto between the two cigarette lighter plugs. U.S. Pat. No. 4,464,402 provides jumper cables with circuitry located between the connectors which prevents damage to the battery as a result of reverse or cross connection of the cables or shorting of the connectors.

SUMMARY OF THE INVENTION

An objective of this invention is to provide a safer way of recharging a low current battery with a high current source. Another objective is to provide a convenient hook-up connection that keeps the inevitable sparks away from the top of the battery. Another object of the invention is to provide a trickle jumper which controls the rate of charging to about 3 amps or below. Other objects, aspects, and advantages of the present invention will be apparent from the detailed description and the accompanying drawings.

The present invention is a trickle jumping device for storage batteries. The invention provides a trickle jumping device which allows an easy, safe trickle charging of storage batteries. According to the subject invention, a safe, substantially explosion free trickle jumping device which gives an accurate, constant charging rate of no more than 3 amps holding current and preferably between 0.5 amps and 3 amps is provided.

The trickle jumper of the subject invention has two electrical connectors preferably clip connectors for connection to the positive and negative terminals of a charged battery. Each clip is attached to a conductor. The conductor attached to the positive clip (hereinafter the first positive conductor) is also attached at its opposite end to a positive contact on a first connector, preferably a female receptacle. Similarly, the conductor attached to the negative clip (hereinafter the first negative conductor) is attached to a negative contact on the first connector. Intermediate the ends of the first positive conductor is located as a current limiting device, preferably a wire wound resistor which limit the current flow to 2 amps or less. A polarity limiting device, most preferably a diode is series connected to the current limiting device between the two ends of the positive connector. A first and second coupling are provided for connection to the positive and negative terminals respectively of the storage battery to be trickle charged. The coupling configuration is dependent on the type of terminal provided on the particular storage battery. The first and second coupling are each attached to conductors which are in turn attached at the opposite ends to a second connector, preferably a plug having a positive and negative contact. The conductor attached to the first coupling is attached to the positive contact of the connector and the conductor attached to the second coupling is attached to the negative contact.

In use the trickle jumper is first connected to the discharged storage battery through the first and second couplings. The jumper is then connected to the charged battery of the same voltage as the discharged battery through the electrical connectors. It should be noted that the order of connection can be reversed and the charged battery can be connected before the discharged battery is hooked up. The final hook-up is made by mating the first and second connectors, preferably a plug and female receptacle. The final hook-up is made at a suitably safe distance from either battery so the possibility of igniting flammable gasses generated at the battery terminals is substantially eliminated.

In operation, the current limiting means limits the flow of current to the discharged battery to a safe level as recommended by the battery manufacturer or appliance manufacturer. In practice, the charging rate should not exceed a 6 amp surge 3 amp constant. The particular resistor will be chosen depending on the size of the battery to be charged and the size of the charged battery. When the polarity feature (preferably a diode) is included in the trickle jumper, the possibility of battery damage from a reverse current flow from an incorrect connection to the recharging source is eliminated. Generally when the trickle jumper is hooked up, the appliance or other piece of equipment receives enough power to be operable shortly after hook-up. Consequently, the subject invention provides a safe, efficient way to charge storage batteries and to put the appliance or other piece of equipment into immediate operation.

BRIEF DESCRIPTION OF THE DRAWINGS

FIG. 1 is a schematic diagram of the trickle jumper battery charger.

FIG. 2 is a schematic diagram illustrating a modified embodiment of the trickle jumper with polarity in accordance with the present invention.

FIG. 3 is a schematic diagram showing an alternate embodiment of the present invention.

FIG. 4 is a perspective view of the assembled trickle jumper.

FIG. 5 is a schematic diagram of the various types of connectors used in coupling the charger to the batteries.

FIG. 6 is a schematic diagram of an alternate embodiment of the present invention.

DETAILED DESCRIPTION OF THE PREFERRED EMBODIMENTS

The present invention provides a trickle jumper charger which has two electrical connectors preferably clip connectors for connection to the positive and negative terminals of a charged battery. Each clip is attached to a conductor. The conductor attached to the positive clip is also attached at its opposite end to a positive contact on a first connector preferably a female receptacle. Similarly, the conductor attached to the negative clip is attached to a negative contact on the first connector. Intermediate the ends of the positive conductor is located a current limiting device, preferably a wire wound resistor. A polarity limiting device most preferably a diode is series connected to the current limiting device between the two connecting ends of the positive connector. A first and second coupling are provided for connection to the positive and negative terminals respectively of the battery to be trickle charged. The coupling configuration is dependent on the type of terminal provided on the particular storage battery. The first and second couplings are each attached to conductors which are in turn attached at the opposite ends to a second connector, preferably a plug having a positive and negative contact. The conductor attached to the first coupling is attached to the positive contact of second connector. The conductor attached to the second coupling is attached to the negative contact of the second connector.

As shown in FIG. 1 a trickle jumper charger 10 is provided for connection to a battery 20 at the negative terminal using a clip connector 9. Clip connector 9 is attached to conductor 16 which in turn is attached to a female receptacle connector 7 at negative contact 22. Connection to contact 22 is made through plug 11 to contact 24 through conductor wire 36 to a coupling 32. Female receptacle connector 7 and plug 11 are shaped such that plug 11 can be only received by female receptacle connector 7 in one direction so that the positive contacts on plug 11 can only be contacted with the positive contacts on female receptacle connector 7. Coupling 32 can be of any suitable type for connection to a storage battery. For examples, a clip connector such as clip 9 would be suitable. Other suitable couplings or connectors are shown in FIG. 5 such as banana plug connector 13, crimp eyelet 14, crimp bullet 26 or crimp blade 27. Further couplings are possible depending on the configuration of the negative storage battery terminal 21. Connector 8 is attached to the positive terminal of battery 20 and in turn is attached to conductor 17 which is connected to a resistor 15 located in the center of conductor 17 then to contact 23 of female receptacle connector 7. Connection to contact 23 is made through contact 25 of plug 11 on conductor 17 through conductor wire 34 to coupling 30. Referring to FIG. 5, examples of preferred couplings 30 are shown as plug 12 clip connector of the type used in positive terminal connector 8, crimp eyelet 14, crimp bullet 26, or crimp blade connector 27 for connection to the positive terminal of storage battery 21.

When the trickle charger is hooked up, the current from the charged battery 20 flows through negative connector 9 to conductor 16 through contact 22, of directional female receptacle connector 7 and contact 24 of plug 11 to conductor 36 to coupling 32 to the negative terminal of discharged storage battery 21 and back through the positive terminal of storage battery 21 through coupling 30 and conductor 34 through contact 25, 23 of female receptacle connector 7 and plug 11, through conductor 17 to current-limiting wire-wound resistor 15 through conductor 17 to connector 8 to charged positive terminal of battery 20. Storage battery 21 and charged battery 20 should be the same voltage.

In operation, one first connects plug 11 to discharged battery 21 by attaching coupling 32 to the negative terminal, then attaching coupling 30 to the positive terminal of battery 21. Note plug 11 and female receptacle connector 7 are disconnected at this time. Then the positive clip 8 of the main charging unit 10 is connected to the positive terminal of charged battery 20. Likewise, the negative clip 9 is connected to the negative terminal of battery 20. When plug 11 and female receptacle connector 7 of the charger 10 are mated, charging of the storage battery begins. Preferably in the trickle charger all the connectors are color coded and most preferably the positive connections are colored red and the negative connectors black.

When completely connected to both the charged battery and discharged battery, the charging current is limited by a wire wound resistor 15. If, for example a resistor of 10 ohm 25 watt rating were used in a 12 volt charging circuit, the maximum current flow would be 1.2 amps which could flow from battery 20 to battery 21, using approximately 14.4 watts of power. This rate of charge would be the maximum for a 12 amp hour battery, or larger. Most manufacturers recommend to charge at a 10% rate for 24 hours, but most appliances will operate and function shortly after the jumper 10 is connected at plug 11 and female receptacle connector 7.

In FIG. 3 an alternate circuit of charger 10 is shown. In this circuit, the designs of FIG. 1 and FIG. 2 are combined with an auto-resetting 3 amp holding-current circuit breaker 19 to resistor 15 and diode 18 to complete a preferred version of charger 10. This embodiment allows a two-stage charging value which will lose less watts of power from battery 20 thus a higher end voltage.

As shown in FIG. 4 the trickle charging device is preferably encased in a housing 1 and includes a central cord 6 which encloses the positive and negative conductors 16 and 17. The housing can for example be a one (1) inch pvc pipe 1 having one (1) inch slip-clips 2 locking the cord 6 with locks 3. This configuration provides a durable protective shed for the circuitry of charge 10.

In FIG. 5 are illustrated examples of various styles of coupling or connector that can be used according to the invention. The directional slip connector shown in FIG. 5, locks in plug 11 to female receptacle connector 7 leaving no missconnections of charger 10. The clip illustrated in FIG. 5, 2 is the same clip at the jaws 8*b* & 9*b* but differ at the boot with 8A red and 9A black. The color separation represents red (positive) and black (negative). FIG. 5, 3 represents an example of male connector 11, other couplings and connectors are shown as: 12 red banana plug, 13 black banana plug, 14 crimp eyelet, 26 crimp bullet, 27 crimp blade, and clip 8 or 9 for connection to battery 21. In the case of clips 8 and 9, they are also used for connection to battery 20.

As shown in FIG. 6 a further alternate circuit of charger 10 is shown. In this circuit the designs of FIG. 1 and FIG. 2 are combined with an open two-pole switch 28, to allow the current to flow through resistor 15 and diode 18 as a completed circuit, but allowing the optional engagement of switch 28 to by-pass resistor 15 and diode 18 to supply additional current when desired. Switch 28 and wires 16 and 17 are protected from damaging current overloads a circuit-breaker 29 preferably a 30 amp circuit breaker which is most preferably an auto resetting circuit breaker. This embodiment allows the batteries of the same voltages 20 and 21 to be charged with current-limiting and directional protection, but adds a by-pass feature to allow greater current flow, on demand, to supply the need, while protecting the trickle charging device from damage by too much current with an auto-resetting circuit-breaker.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

I claim:

1. A trickle jumper for charging storage batteries from a charged battery of like voltage comprising:
    a first electrical connection means for connection to the positive terminal of a charged battery;
    a second electrical connection means for connection to the negative terminal of a charged battery;
    a first conductor means attached at one end to said first electrical connection means;
    a second conductor means attached at one end to said second electrical connection means;
    a first connector means having a positive and a negative contact, said first connection means in electrical contact with said first conductor means at said positive contact and with said second conductor means at said negative contact;
    a first coupling means for connection to the positive terminal of a storage battery in need of charging;
    a second coupling means for connection to the negative terminal of a storage battery in need of charging;
    a third conductor means connected to said first coupling means;
    a fourth conductor means connected to said second coupling means;
    a second connector means having a positive and a negative contact, said second conductor means shaped for mating with said first connector means such that connection of the positive contact to positive contact and negative contact to negative contact are the only connection possible, said second connector means in electrical contact with said third conductor means at said positive contact and with said fourth conductor means in electrical contact at said negative contact;
    current limiting means located between the two connecting ends of said first conductor for limiting the flow of current through said first conductor to no more than 3 amps holding current;
    polarity limiting means connected to said current limiting means to limit the direction of the current flow in the event of a reverse hook up of the trickle jumper;
    by-pass means to selectively by-pass said current limiting means and said polarity limiting means to provide a current spike to said storage battery;
    circuit breaking means connected to said first conductor means to protect the trickle jumper from damage as a result of heavy current flow when said by-pass means is activated.
    whereby electrical connection between said charged battery and said storage battery is made only when said first and second connectors are mated.

2. The trickle jumper of claim 1 wherein said current limiting means is a wire-wound resistor.

3. The trickle jumper of claim 2 wherein said polarity limiting means is a diode connected in series with said wire-wound resistor located between the two connecting ends of said first conductor; said diode limiting the direction of the flow of current through said first conductor.

4. The trickle jumper of claim 2 wherein said first connector is a female receptacle connector and said second connector is a plug, said plug shaped to fit said female receptacle connector in a single direction so that the positive terminal of said plug can only be connected to said positive terminal of said female receptacle connector.

5. The trickle jumper of claim 2 wherein all connections are color coded such that all positive connections are red and all negative connections are black.

6. The trickle jumper of claim 1, wherein said circuit breaking means is automatically resetable.

7. The trickle jumper of claim 1 wherein said circuit breaker means is a 30 amp circuit breaker.

8. The trickle jumper of claim 1 wherein said by-pass means is a two-pole switch; said switch connected to said first conductor means before said current limiting means and after said polarity limiting means to by-pass said current limiting means and said polarity limiting means when said switch is engaged.

* * * * *